(12) United States Patent
Marur et al.

(10) Patent No.: US 8,643,492 B2
(45) Date of Patent: Feb. 4, 2014

(54) ENCAPSULATED RFID TAGS AND METHODS OF MAKING SAME

(75) Inventors: Sudhakar R. Marur, Bangalore (IN); Theethira Kushalappa Poovanna, Bangalore (IN); Venkatesha Narayanaswamy, Bangalore (IN)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/599,427

(22) Filed: Aug. 30, 2012

(65) Prior Publication Data

US 2012/0318877 A1 Dec. 20, 2012

Related U.S. Application Data

(63) Continuation of application No. 12/420,366, filed on Apr. 8, 2009, now Pat. No. 8,325,047.

(51) Int. Cl.
*G08B 13/14* (2006.01)

(52) U.S. Cl.
USPC ........ 340/572.8; 235/492; 257/728; 257/738; 438/106; 438/118

(58) Field of Classification Search
USPC ............ 340/572.7, 572.8; 235/375, 376, 487, 235/492; 257/728, 738; 438/106, 118
See application file for complete search history.

(56) References Cited

U.S. PATENT DOCUMENTS

| | | |
|---|---|---|
| 3,444,440 A | 5/1969 | Bell et al. |
| 4,339,407 A | 7/1982 | Leighton |
| 4,480,975 A | 11/1984 | Plummer et al. |
| 4,890,152 A | 12/1989 | Hirata et al. |
| 4,912,288 A | 3/1990 | Atkinson et al. |
| 5,039,472 A * | 8/1991 | Salensky et al. ............. 264/341 |
| 5,319,522 A | 6/1994 | Mehta |
| 5,640,746 A | 6/1997 | Knecht et al. |
| 5,760,526 A | 6/1998 | Anderson |
| 5,895,321 A | 4/1999 | Gassies et al. |
| 6,021,949 A | 2/2000 | Boiron |
| 6,049,463 A | 4/2000 | O'Malley et al. |

(Continued)

FOREIGN PATENT DOCUMENTS

| | | |
|---|---|---|
| EP | 0436497 A2 | 7/1991 |
| EP | 0649719 A1 | 4/1995 |

(Continued)

OTHER PUBLICATIONS

European Patent No. 0649719 (A1); Publication Date: Apr. 26, 1995; Abstract Only; 1 Page.

(Continued)

*Primary Examiner* — Hung T. Nguyen
(74) *Attorney, Agent, or Firm* — Cantor Colburn LLP

(57) ABSTRACT

Encapsulated radio frequency identification (RFID) articles having enhanced break strength and/or temperature resistance and methods of making these articles. The RFID articles include an RFID tag embedded within a thermoplastic substrate to form the RFID article. In one embodiment, the RFID article includes an over-molded barrier material that enables the RFID article to have enhanced temperature resistance such that the articles are able top sustain repeated exposure to high temperatures and/or sterilization procedures, thereby enabling the RFID articles to be utilized in applications heretofore unavailable. In other embodiments, the RFID articles are made using an injection molding process that provides very thin encapsulated RFID tags that also exhibit an increased level of temperature resistance.

16 Claims, 7 Drawing Sheets

(56) References Cited

U.S. PATENT DOCUMENTS

| | | |
|---|---|---|
| 6,206,282 B1 | 3/2001 | Hayes, Sr. et al. |
| 6,256,873 B1 | 7/2001 | Tiffany, III |
| 6,264,109 B1 | 7/2001 | Chapet et al. |
| 6,407,461 B1 | 6/2002 | Farquhar et al. |
| 6,469,258 B1 | 10/2002 | Lee et al. |
| 7,220,617 B2 | 5/2007 | Kagii et al. |
| 2002/0076859 A1 | 6/2002 | Johnson et al. |
| 2003/0076662 A1 | 4/2003 | Miehling |
| 2004/0110323 A1 | 6/2004 | Becker et al. |
| 2004/0188010 A1 | 9/2004 | Chaoui |
| 2004/0237299 A1 | 12/2004 | Stelzl et al. |
| 2005/0001767 A1 | 1/2005 | Wulff et al. |
| 2005/0197074 A1 | 9/2005 | Cullen et al. |
| 2006/0071083 A1 | 4/2006 | Appalucci et al. |
| 2007/0163704 A1* | 7/2007 | Jarvinen et al. ............... 156/238 |
| 2008/0210761 A1* | 9/2008 | Jeon ............................. 235/492 |
| 2009/0096613 A1 | 4/2009 | Westrick |

FOREIGN PATENT DOCUMENTS

| | | |
|---|---|---|
| EP | 0947952 A2 | 10/1999 |
| EP | 1123792 A1 | 8/2001 |
| WO | 0126136 A2 | 4/2001 |
| WO | 2005017995 A1 | 2/2005 |
| WO | 2005069209 A1 | 7/2005 |
| WO | 03045661 A1 | 6/2006 |

OTHER PUBLICATIONS

European Patent No. 1123792 (A1); Publication Date: Aug. 16, 2001; Abstract Only; 1 Page.

International Search Report; International Application No. PCT/IB2010/051042; International Filing Date: Mar. 10, 2010; Date of Mailing: Aug. 26, 2010; 3 Pages.

Written Opinion of the International Searching Authority; International Application No. PCT/IB2010/051042; International Filing Date: Mar. 10, 2010; Date of Mailing: Aug. 26, 2010; 7 Pages.

* cited by examiner

ENCAPSULATED RFID TAGS AND METHODS OF MAKING SAME

CROSS REFERENCE TO RELATED APPLICATIONS

The present application is a continuation of U.S. application Ser. No. 12/420,366, filed Apr. 8, 2009, now U.S. Pat. No. 8,325,047, the contents of which are incorporated herein by reference.

FIELD OF INVENTION

The present invention relates to radio frequency identification (RFID) articles and, in particular, to encapsulated RFID articles having enhanced temperature resistance.

BACKGROUND OF INVENTION

Radio frequency identification (RFID) tags include a microchip combined with an antenna. The tag is generally included in packaging that is designed to permit the RFID tag to be attached to an object to be tracked. The tag's antenna picks up signals from an RFID reader or scanner and then returns the signal, usually with some additional data that identifies the contents of the package or otherwise identifies the item tagged.

RFID tags typically come in two types—passive tags and active tags. Passive tags require no internal power source, whereas active tags require a power source. Since passive RFID tags have no internal power supply, they can be quite small in size, thereby enabling them to be used in a wide array of applications. For example, RFID tags have been used in passports, electronic payment systems, cargo tracking systems, automotive applications, animal tracking applications, and have even begun being used in humans for providing health information.

Nevertheless, due to the sensitivity of the components used to form the RFID tags, the circuitry and/or antennas, the RFID tags can become damaged or inoperable when subjected to environmentally unfriendly environments, such as those with high temperatures and/or those operated under sterilization conditions. In many prior art RFID articles, the RFID tags are located within two-piece structures that, due to the manufacture of the article, includes seams where the two pieces are joined. As used herein, "seams" are those areas where two pieces of a thermoplastic structure are joined together. These two pieces may be mechanically or chemically attached to one another, but the resulting structure still includes a seam. While acceptable for standard use, during sterilization events, the RFID article is subjected to high heat and/or steam, which causes the seams to expand slightly, enabling the sterilization medium to enter into the cavity of the RFID article, thereby damaging the electrical components of the RFID tag and rendering the RFID article non-functioning after just a few sterilization cycles.

In addition, due to the seams, the RFID articles of the prior art have a structural weakness at the seam such that even if a higher impact thermoplastic material or materials is used to form the RFID housing, the RFID articles have lower break strengths as the RFID article will typically fail at the point of the seam. This is especially true for articles that have been subjected to sterilization conditions that help weaken the article along these seams.

Accordingly, it would be beneficial to provide an RFID article having enhanced thermal resistance and/or break strength. It would also be beneficial to provide an RFID article that may be subjected to repeated exposures to sterilization conditions without damage to the RFID tag. It would also be beneficial to provide an RFID article that may be easily manufactured.

SUMMARY OF THE INVENTION

Encapsulated radio frequency identification (RFID) articles having enhanced break strength and/or temperature resistance and methods of making these articles. The RFID articles include an RFID tag embedded located in a thermoplastic substrate or housing to form the RFID article. In one embodiment, the RFID article includes an over-molded seal that enables the RFID article to have enhanced break strength and/or temperature resistance such that the articles are able to sustain repeated exposure to high temperatures and/or sterilization procedures, thereby enabling the RFID articles to be utilized in applications heretofore unavailable. In other embodiments, the RFID articles are made using an injection molding process that provides very thin encapsulated RFID tags that also exhibit an increased level of temperature resistance.

Accordingly, in one aspect, the present invention provides a radio frequency identification article including a housing comprising a first piece having a cavity and a second piece, a radio frequency identification tag located in the cavity of the first piece, the radio frequency identification tag comprising a microchip and an antenna, and a sealing material encompassing at least a portion of the housing, the sealing material helping to secure the first piece to the second piece and helping prevent moisture from contacting the radio frequency identification tag; wherein the radio frequency identification article has enhanced break strength and thermal resistance.

In another aspect, the present invention provides a radio frequency identification article including a housing comprising a substrate, a radio frequency identification tag located on the substrate, the radio frequency identification tag comprising a microchip and an antenna, a barrier layer adjacent the substrate and covering the radio frequency identification tag, and a sealing material encompassing the housing and the barrier layer, the sealing material helping to secure the first piece to the second piece and helping prevent moisture from contacting the radio frequency identification tag; wherein the radio frequency identification article has enhanced break strength and thermal resistance.

In still another aspect, the present invention provides a method of forming a radio frequency identification article including the steps of providing a first piece capable of holding a radio frequency identification tag, placing a radio frequency identification tag in connection with the first piece; wherein the radio frequency identification tag comprises a microchip and an antenna, securing the radio frequency identification tag with the first piece using a second piece, and overmolding a sealing material to encompass at least a portion of the first piece and the second piece to provide enhanced break strength and thermal resistance; wherein the radio frequency identification article has enhanced break strength and thermal resistance.

BRIEF DECRIPTION OF THE DRAWINGS

DETAILED DESCRIPTION OF THE INVENTION

Figure 1:
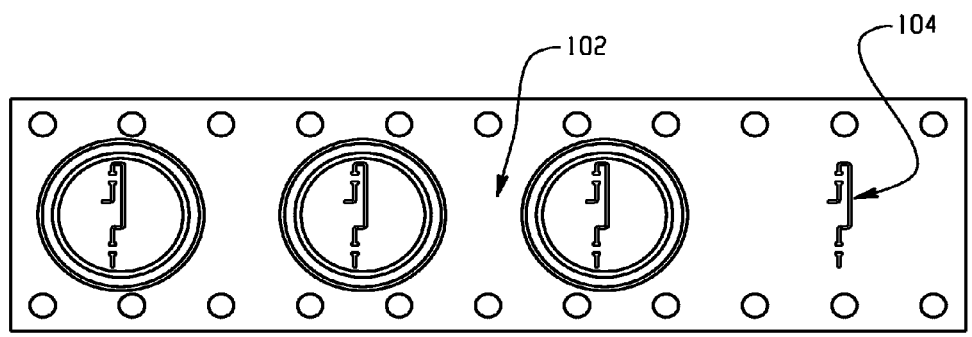
FIG. 1 is a top view of one embodiment of a radio frequency tag placed on an underlying substrate according to one embodiment of the present invention.
Figure 2:
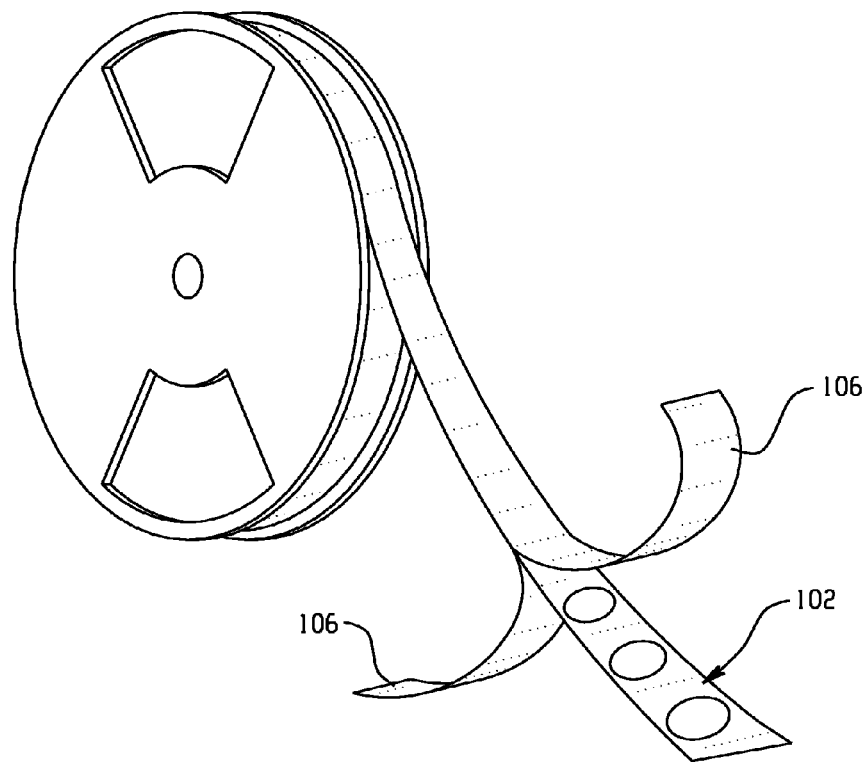
FIG. 2 is a perspective view of a substrate layer and two barrier layers used to form an RFID article according to one embodiment of the present invention.
Figure 3:
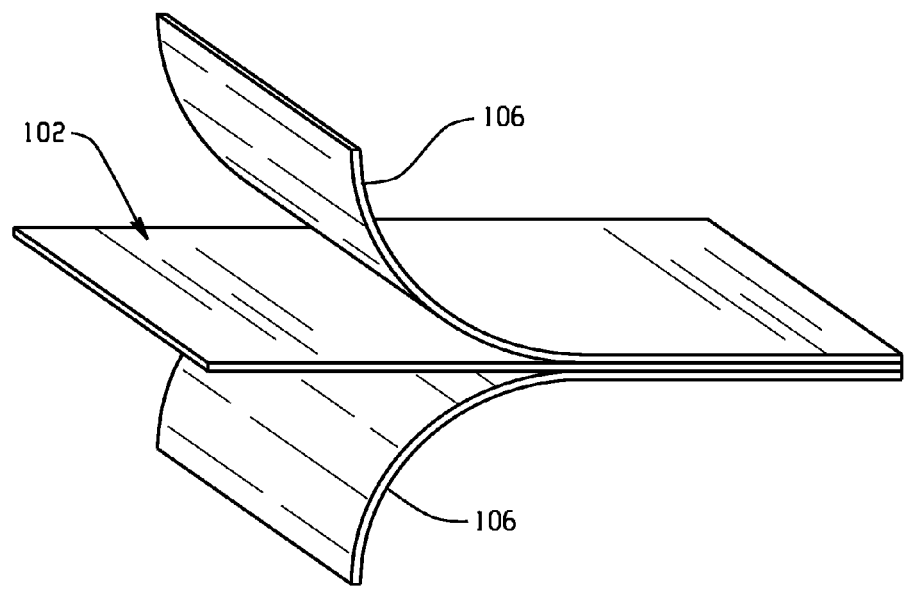
FIG. 3 is a close-up view of a substrate layer and two barrier layers used to form an RFID article according to one embodiment of the present invention.
Figure 4:
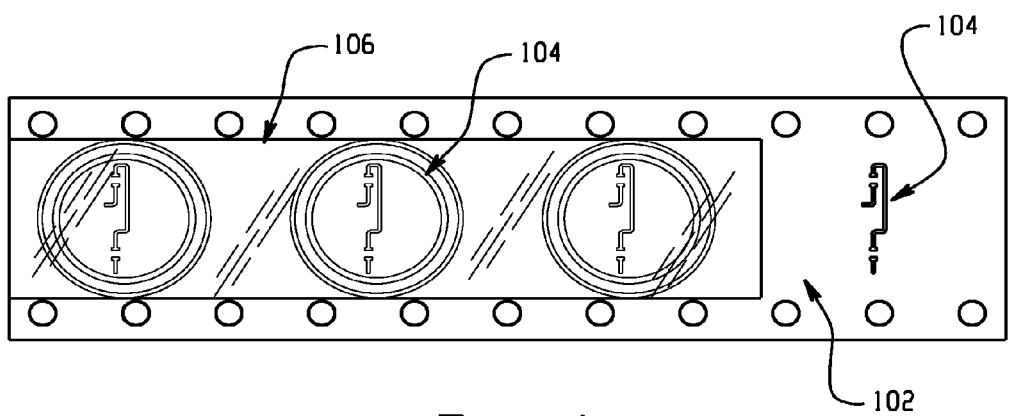
FIG. 4 is a top view of one embodiment of a radio frequency identification article according to one embodiment of the present invention.

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The present invention provides a radio frequency identification (RFID) article capable of withstanding repeated exposure to high heat events without damage to the electrical components of the RFID article. The RFID article includes a housing or substrate constructed from a thermoplastic material, an RFID tag located in the housing, and an overmolded seal around the housing that helps secure the RFID tag in the housing while also providing enhanced protection to the RFID tag during repeated exposure to high heat conditions, such as those associated with sterilization.

Accordingly, in one aspect of the present invention, the RFID article includes a housing capable of holding an RFID tag. In one embodiment, the housing is a one-piece housing capable of holding an RFID tag. In an alternative embodiment, the housing is a two-piece housing having a cavity into which the RFID tag may be placed. In both embodiments, the RFID tag includes a microchip, an antenna and, for active tags, a power source.

In another aspect of the present invention, the RFID tag includes an overmolded seal around the housing that is designed to help secure the RFID tag in the housing as well as provide enhanced break strength and/or thermal resistance. The type of seal utilized may vary depending on the type of housing, but in each embodiment, the seal includes a thermoplastic material that is overmolded after the RFID tag has been placed in the housing. The result is an RFID tag having enhanced break strength and/or thermal resistance. The seal material is shaped to either encompass, in whole or in part, the housing or, in select two-piece alternative embodiments, to provide a locking mechanism to help secure the two pieces to one another.

Accordingly, in one embodiment, the RFID article includes a one-piece housing capable of holding an RFID tag. The one-piece housing may include a thermoplastic substrate onto which the RFID tag is located, or may include a thermoplastic article having a cavity into which the RFID tag is located. In each instance, the seal includes a thermoplastic material that is overmolded around the housing to form a resulting barrier structure that provides increased break strength to the RFID article through the characteristics of the overmolded seal material while also providing enhanced thermal resistance since the components of the RFID tag are encased with the seal material, which acts as a barrier layer during sterilization conditions, thereby giving the material enhanced thermal resistance. In addition, since an overmolding step is used, there are two layers of thermoplastic material, which increases the break strength of the RFID article. And depending on the type of overmolding step or steps performed, seams can be substantially reduced or even eliminated, thereby further increasing the break strength and/or thermal resistance of the RFID article.

The overmolded seal layer in this embodiment is designed to encompass or substantially encompass the substrate and RFID tag. By encompassing the substrate and tag, the material characteristics of the seal material, as it relates to break strength and moisture barrier, provide the enhanced break strength and/or thermal resistance to the RFID tag and, therefore, the RFID article. If a stronger RFID article is desired, a stronger substrate material and/or sealing material may be used. If greater temperature resistance and/or moisture barrier are desired, a plastic material having high heat deformation temperature and/or moisture prevention may be used.

In another embodiment, the RFID article includes a two-piece housing capable of holding an RFID tag. In this embodiment, the housing includes a first piece having a cavity into which the RFID tag may be placed. The housing also includes a second piece that connects to the first piece to capture the RFID tag within the housing. As this embodiment provides a structure having seams or seams, the overmolded seal is selected to help reduce the issues associated with the seams, for break strength and/or for thermal resistance. Accordingly, in one aspect, the overmolded seal provides mechanical features that help secure the two pieces of the housing to one another, thereby increasing the mechanical or break strength of the RFID article. In another aspect, the seal provides additional protection to the seams by helping to cover or encase the seams, thereby increasing the thermal resistance of the RFID article.

In the two-piece housing embodiment, the seal material is shaped to match, or substantially match a corresponding portion of the two housing pieces to help provide a mechanical lock to the two pieces. In this embodiment, the two housing pieces beneficially join one another such that they form a nonlinear shape at the location where the two pieces are joined. Accordingly, in a first embodiment, when the two pieces are joined to one another, at least one curved or angled edge is formed. As such, when the sealing material is overmolded to the housing, the sealing material helps "lock" the two pieces to one another, thereby resulting in a break strength comparable to that of the overmolded seal material, rather than the amount of force simply needed to break the adhesive or mechanical bond between the two pieces of the housing. In addition, by angling the connection between the two pieces, a longer path is created, thereby increasing the distance any moisture needs to traverse in order to contact the RFID tag components. In one embodiment, the two housing pieces form a V-shaped edge. In another embodiment, a W-shaped edge is formed. In still another embodiment, a C-shaped or U-shaped edge is formed. Other non-linear shapes are contemplated to be within the scope of the claimed invention provided an overmolded plastic material is capable of contacting all or substantially all of the non-linear surface to increase the break strength of the resulting RFID article, such as curved edges or angled edges or the like.

In addition, or in an alternative embodiment, the sealing material may also be shaped such that it connects to the housing in one or more locations to help provide additional structure designed to increase the break strength of the RFID article. For example, in one embodiment, the housing includes a plurality of holes. The sealing material is selected such that, during the overmolding process, the sealing material fills these holes. Since the overmolding occurs with a sealing material that is liquefied during the overmolding process, the sealing material is selected to be capable of flowing into and filling any holes. Then, after the sealing material has cooled, the sealing material forms a solid structure that includes one or more additional locking mechanisms to help secure the housing pieces to one another.

In another embodiment, as with the one piece housing embodiments, the sealing material may be overmolded such that it encompasses all, or substantially all, of the housing after the RFID tag has been placed in the housing. As in the one-piece embodiment, encompassing the housing and tag enables the material characteristics of the seal material, as it relates to break strength and moisture barrier, to help provide the enhanced break strength and/or thermal resistance to the RFID article. In these embodiments, the two housing pieces may have seams that are nonlinear, as with previous two housing embodiments. However, linear seam embodiments are also capable since the seal material itself is providing the enhanced break strength and/or thermal resistance.

Accordingly, the present invention provides a plastic RFID article that includes a housing constructed from a plastic resin and a seal that is also selected from a plastic resin. Both the housing and the seal are selected from plastic resins capable of being molded. In one embodiment, the plastic resin may be selected from a wide variety of thermoplastic resins, blend of thermoplastic resins, thermosetting resins, or blends of thermoplastic resins with thermosetting resins. The plastic resin may also be a blend of polymers, copolymers, terpolymers, or combinations including at least one of the foregoing plastic resins. Examples of the plastic resin include, but are not limited to, polyacetals, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, or the like, or a combination including at least one of the foregoing plastic resins.

Specific non-limiting examples of blends of thermoplastic resins include acrylonitrile-butadiene-styrene/nylon, polycarbonate/acrylonitrile-butadiene-styrene, polyphenylene ether/polystyrene, polyphenylene ether/polyamide, polycarbonate/polyester, polyphenylene ether/polyolefin, and combinations including at least one of the foregoing blends of thermoplastic resins.

Examples of thermosetting resins include polyurethane, natural rubber, synthetic rubber, epoxy, phenolic, polyesters, polyamides, silicones, and mixtures including any one of the foregoing thermosetting resins. Blends of thermoset resins as well as blends of thermoplastic resins with thermosets can be utilized.

The specific resin used for the RFID article may vary depending on the selected characteristics of the final RFID article. Factors that may be used to select the plastic resin include, but are not limited to, the final use for the RFID article, the conditions (temperature, humidity, pressure, etc.) in which the RFID article will be utilized, the selected size and/or shape of the RFID article. In one embodiment, the plastic housing is formed using a plastic resin that is different from the plastic resin used for the seal. In another embodiment, the plastic housing is formed using a plastic resin that is the same as the plastic resin used for the seal.

The RFID articles may be constructed using any conventional molding process used for plastic resins. In one embodiment, the housing of the RFID article may be constructed using an injection molding process, a thermoforming process, or any other molding process capable of forming a formed shape plastic article. In another embodiment, the seal is formed using an overmolding process capable of forming a seal using a plastic resin. In one embodiment, the overmolding process is a lamination process. In another embodiment, the overmolding process is an injection molding step wherein the plastic resin for the seal in injected around the housing.

As discussed, the RFID article has enhanced break strength and/or temperature resistance. As used herein, "enhanced break strength" refers to the tensile force required to get the sheaths/envelops covering the RFID separated through the failure of sheath material or bonding surface or both, thus exposing the encapsulated RFID to the outer environment/ atmosphere. In one embodiment of the present invention, the RFID article shows a bond strength of 1000 N or greater as measured using numerical simulation technique. In another embodiment of the present invention, the RFID article shows a bond strength of 1200 N or greater as measured using numerical simulation technique. In yet another embodiment of the present invention, the RFID article shows a bond strength of 1300 N or greater as measured using numerical simulation technique. This is as compared to a standard laundry tag that shows a bond strength of about 200 N as measured using numerical simulation technique. In order to compare the current concept with the prior art design, the same geometric configuration was considered and both were subjected to the same tensile load, and their resulting performance were critically studied through the well established computer aided engineering and simulation methodologies. As used herein, an RFID article having "enhanced thermal resistance" refers to an RFID article that, in one embodiment, has a better weathering at elevated temperatures and better barrier properties due to the higher contact area, which results in better performance in an autoclave cycle.

The foregoing and other features of the present invention will be more readily apparent from the following detailed description and drawing of one illustrative embodiment of the invention.

Referring to the drawings, FIGS. 1-4 provide one embodiment of an RFID article wherein a one-piece housing or substrate is used. In this embodiment, a first substrate material 102 is provided. The RFID tag 104 is placed on the substrate 102. In an alternative embodiment, the RFID tag 104 is a circuit that is printed into the substrate 102. After the RFID tag 104 has been placed on the substrate 102, the seal layer is provided. In this embodiment, the seal comprises two barrier film layers 106 that are overmolded on either side of the substrate using a lamination process. Due to the lamination and the choice of materials for the barrier layers 106 and the substrate 102, the three layers can be fused together, thereby eliminating or substantially eliminating any seams. As a result, the resulting RFID tag has enhanced thermal resistance. In addition, depending on the selected characteristics, if greater break strength is desired, the substrate and/or barrier layers may be selected using plastic materials having enhanced physical properties and/or by using thicker layers. Conversely, if a thinner RFID article is desired, thinner layers may be used. However, despite the thinner layers, the resulting RFID article will still have enhanced thermal resistance.

Figure 5:
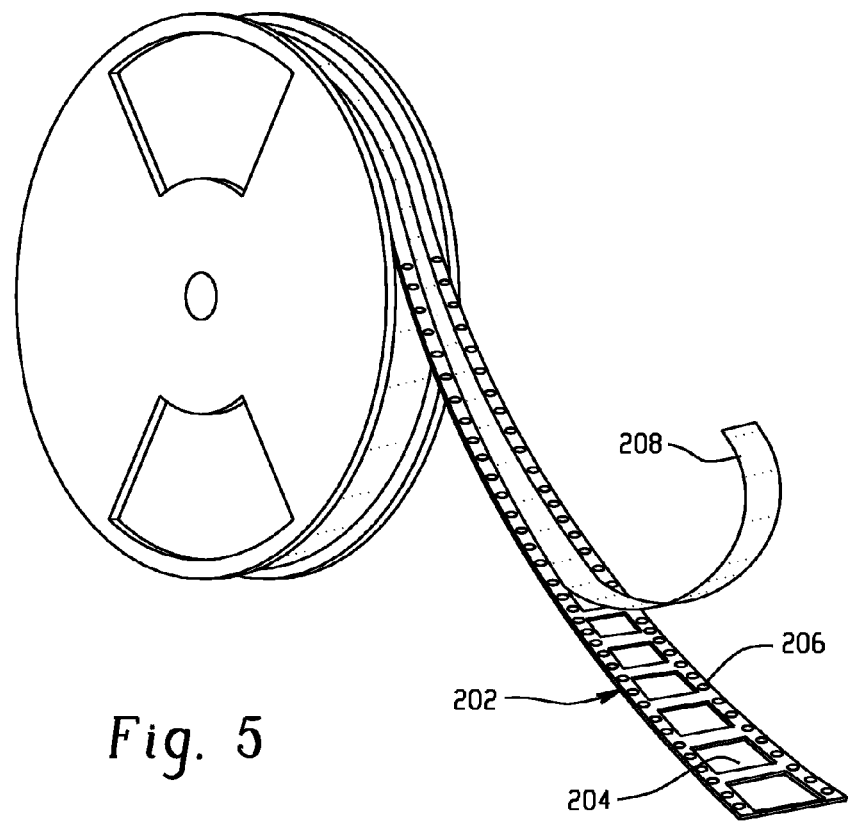
FIG. 5 is a perspective view of a substrate layer and one barrier layers used to form an RFID article according to an alternative embodiment of the present invention.
Figure 6:
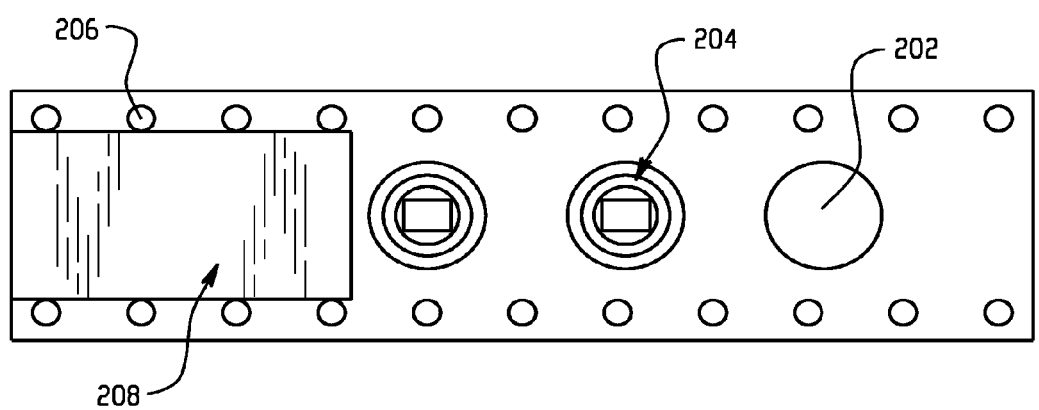
FIG. 6 is a top view of one embodiment of a radio frequency identification article according to an alternative embodiment of the present invention.
Figure 7:
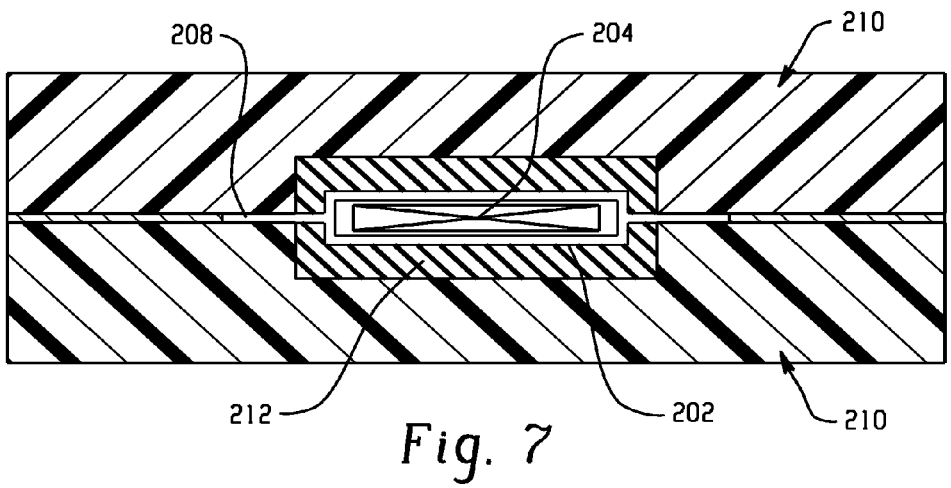
FIG. 7 is a cross-sectional view of an RFID article and a mold used to make the RFID article according to an alternative embodiment of the present invention.

FIGS. 5-7 provide an alternative embodiment of an RFID article 200 wherein a two-piece housing or substrate is used. In this embodiment, a substrate 202 is thermoformed such that the substrate 202 is cup-shaped. The RFID tag 204 is placed within the cup portion of the substrate 202. In this embodiment, placement of the RFID tag 204 can be automated using index holes 206 that enable the proper placement of the RFID tag 204. Once the RFID tag 204 has been placed, a cover layer 208 is placed over the substrate 202 to hold the RFID tag 204 in place and to form the two-piece housing. Then, as seen in FIG. 7, the encapsulated RFID tag 204 may be placed in a molding cavity 210 wherein the overmolded seal material 212 is then introduced to seal the RFID tag 204 and form an RFID article 200 having enhanced break strength and/or thermal resistance.

Figure 8A:
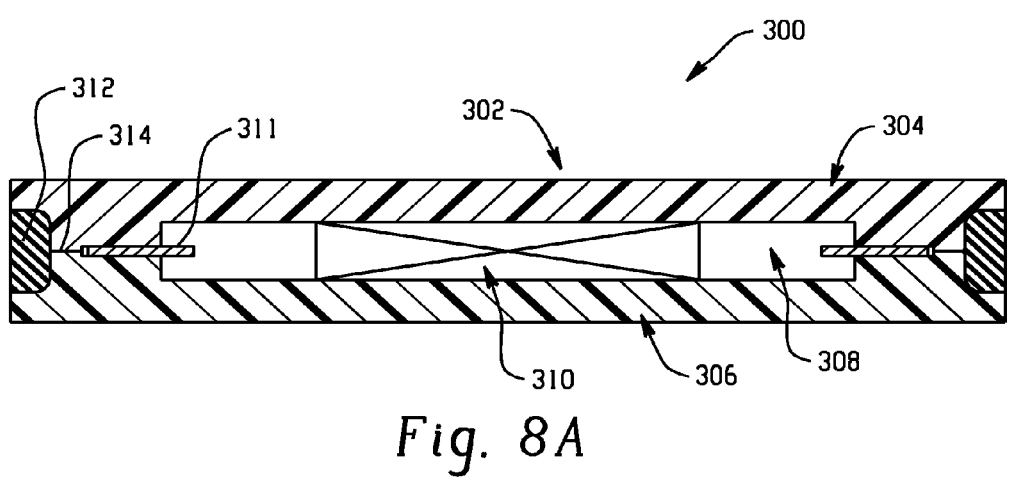
FIG. 8A is a cross-sectional view of an RFID article according to yet another embodiment of the present invention.
Figure 8B:
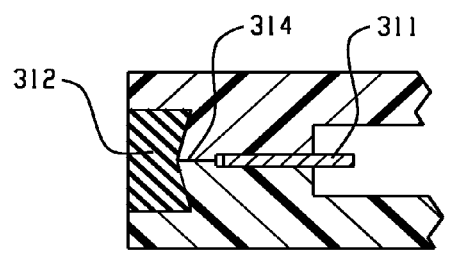
FIG. 8B is an exploded view of an RFID article according to yet another embodiment of the present invention.
Figure 9:
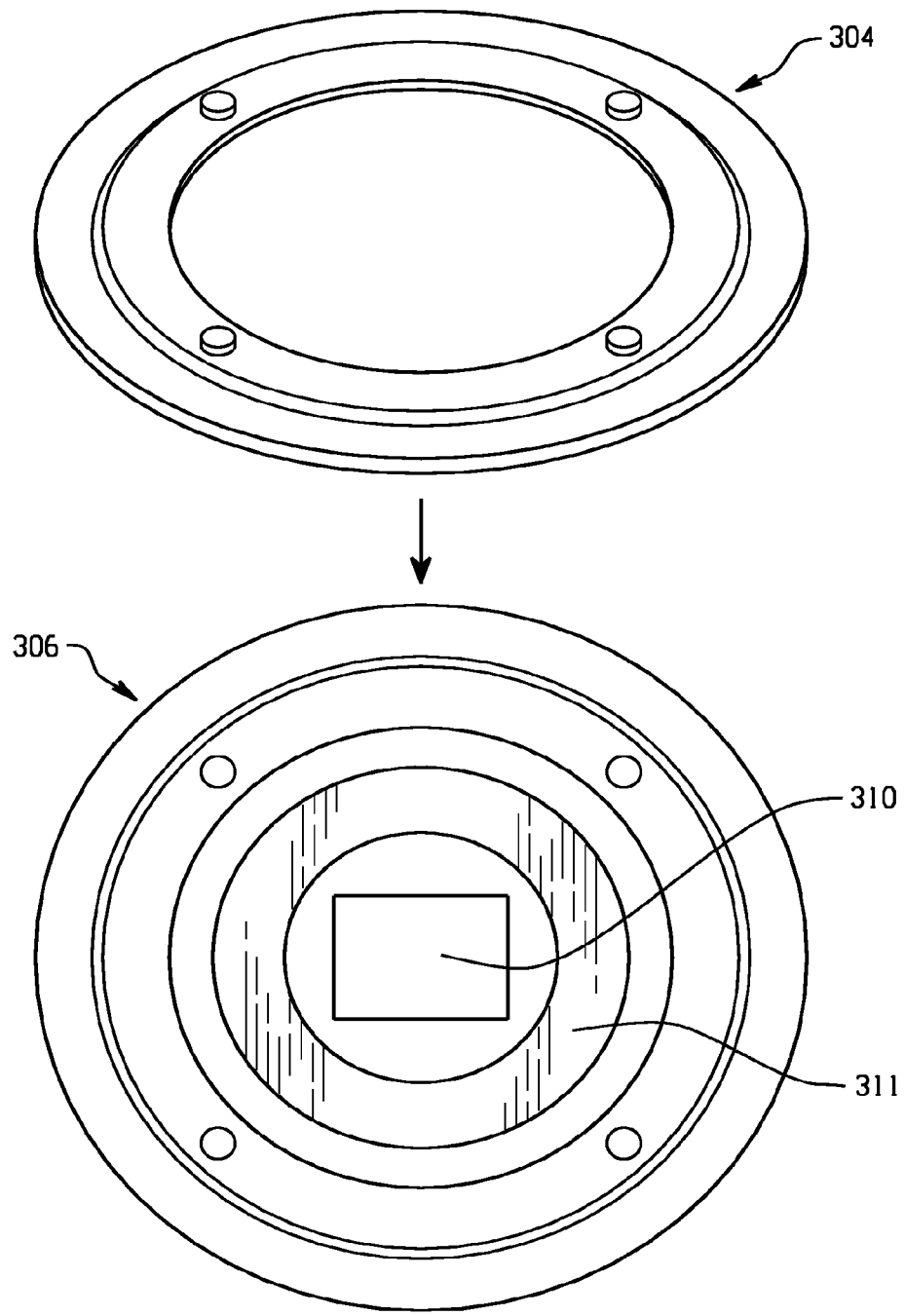
FIG. 9A is an exploded view of an RFID article according to yet another embodiment of the present invention.
FIG. 9B is an exploded view of an RFID article according to yet another embodiment of the present invention.
Figure 10:
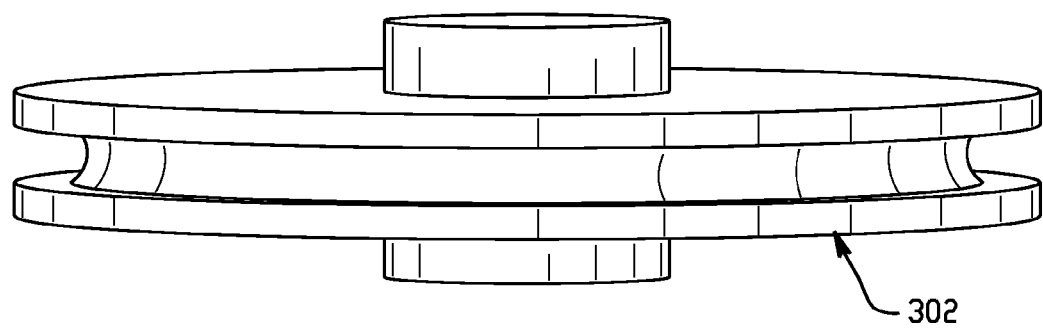
FIG. 10 is a perspective view of the housing of an RFID article according to yet another embodiment of the present invention.

FIGS. 8-10 show an alternative embodiment for an RFID article 300 using a two-piece housing. In this embodiment, the housing 302 includes a first cover 304 and a second cover 306 wherein, when joined together, the resulting housing 302 includes a cavity 308 into which an RFID tag 310, including an antenna 311, may be placed. In this embodiment, the first cover 304 and second cover 306 are formed from a plastic material, which may be the same or different materials, and may be joined using any conventional means for joining two plastic parts to one another, including the use of mechanical locking mechanisms or melting or welding the parts to one another, or through the use of chemical means, such as adhesive materials.

Once the RFID tag 310 has been located within the housing 302 and the first cover 304 and second cover 306 have been joined to one another, a sealing material 312 is overmolded around the housing 302 to cover the seams or seal 314 between the first cover 304 and the second cover 306. By covering or encasing the seams 314, the resulting RFID article 300 has enhanced break strength and/or thermal resistance. As seen in FIG. 10, in one embodiment, the sealing material 312 helps improve thermal resistance by covering the seams/seals 314 and increasing the path any moisture must traverse to contact the RFID tag 310. In addition, the housing 302 can be shaped such that the sealing material 312 acts as a positive lock 316 of the first and second covers 304, 306 to help hold the covers together, thereby increasing the break strength of the article 300.

Figure 11:
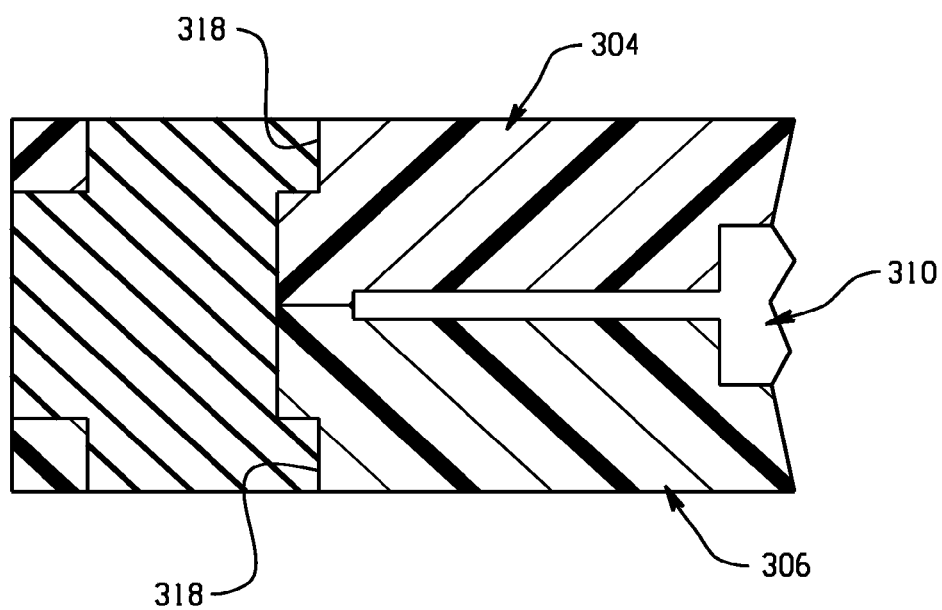
FIG. 11 is a cross-sectional view of an RFID article according to still another embodiment of the present invention.
Figure 12:
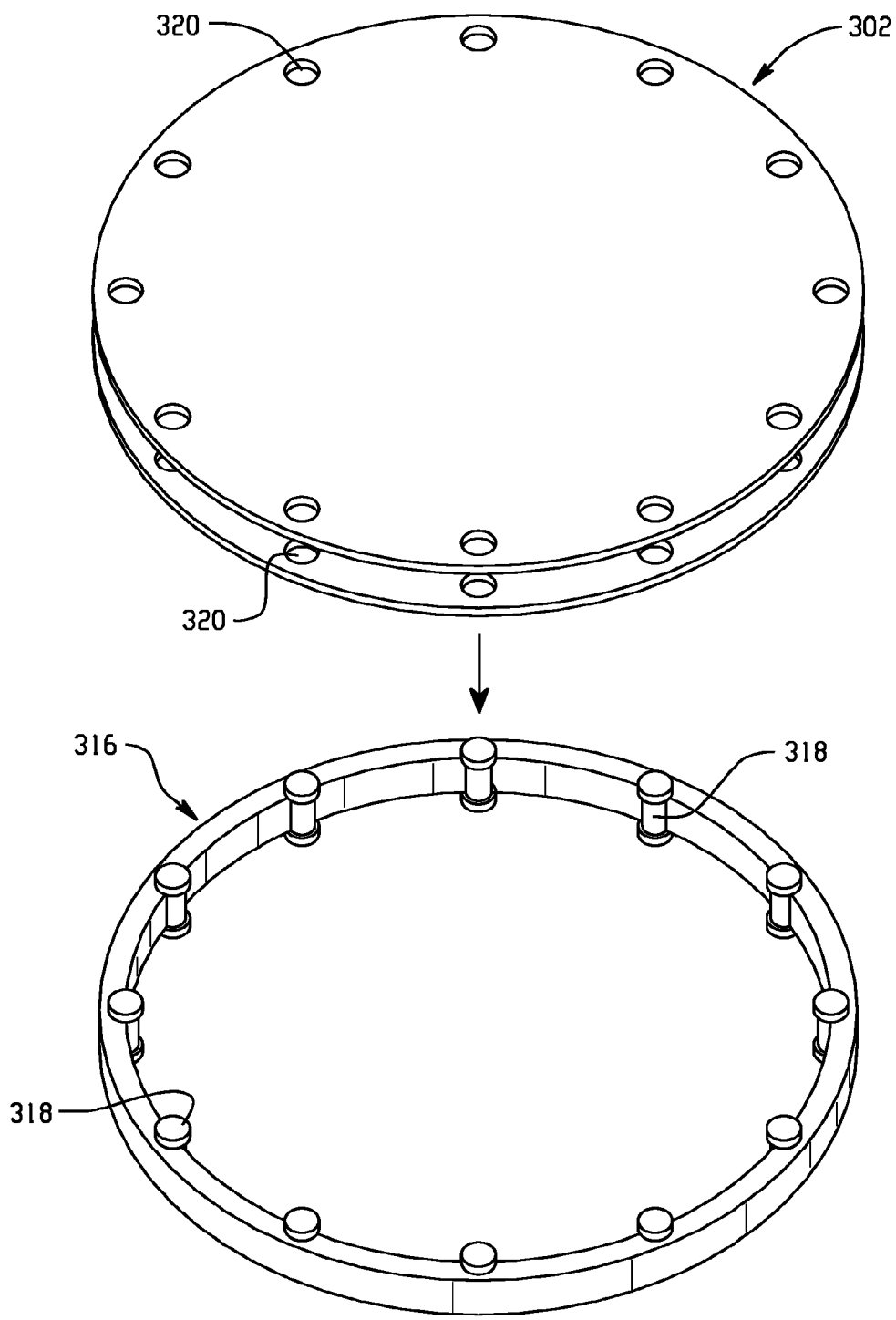
FIG. 12 is an exploded view of an RFID article according to still another embodiment of the present invention.

FIGS. 11-12 show an alternative embodiment of the seal material 312 and how the seal material 312 may be used to form an RFID article 300 having enhanced break strength and/or thermal resistance. In this embodiment, the sealing material is in the form of a sealing ring 314 that includes a plurality of rivets 318 that help secure the sealing ring 316 to the housing 302 via a plurality of holes 320 in the housing. As the cross sectional view shows, the rivets 318 are offset at the top and bottom to help form a positive lock to help secure the first and second covers 304, 306 to one another. Also, as may be seen, in this embodiment, the sealing material 312 does not encase the housing 302, but still provides enhanced thermal resistance by lengthening the path any moisture must traverse to reach the interior of the housing 302 and the RFID tag 310.

It should also be apparent to those skilled in the art that the concepts of the present invention can not only be used to provide RFID articles that may be used in sterilization environments, but also in other applications including, but not limited to, auto immobilizers, transportation/ ticketing applications, supply chain management applications, animal identification devices, RTLS (Real Time Location Systems), security and/or access control applications, toll collections, asset tracking applications, passports/driver's licenses, rental items, baggage tags and the like. In case of sensors it can also be used for crash sensors, accelerometer, strain gauges, pressure transducers, and data acquisition systems. And any article that needs to be encapsulated like outdoor antennas, miniature cameras, archeological preservation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims All citations referred herein are expressly incorporated herein by reference.

The invention claimed is:

1. A radio frequency identification article comprising:
a housing comprising a substrate;
a radio frequency identification tag located on the substrate, the radio frequency identification tag comprising a microchip and an antenna; and
a sealing material wholly encompassing the substrate to form a barrier layer;
wherein the article has enhanced break strength and thermal resistance as compared to the article with the sealing material encompassing less than the whole substrate.

2. The radio frequency identification article of claim 1, wherein the substrate is a thermoformed substrate.

3. The radio frequency identification article of claim 1, wherein the radio frequency identification article can sustain repeated exposure to sterilization procedures.

4. The radio frequency identification article of claim 1, wherein sealing material is formed using a plastic resin, and the plastic resin is selected from polyacetals, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, or a combination including at least one of the foregoing plastic resins.

5. The radio frequency identification article of claim 1, wherein the radio frequency identification article is seamless.

6. The radio frequency identification article of claim 1, wherein the substrate and/or the sealing material are formed from a plastic resin comprising polysulfone.

7. The radio frequency identification article of claim 6, wherein the plastic resin comprises polyarylsulfone.

8. A radio frequency identification article, comprising:
   a housing comprising a substrate;
   a radio frequency identification tag located on the substrate, the radio frequency identification tag comprising a microchip and an antenna; and
   a sealing material encompassing the substrate to form a barrier layer;
   wherein the substrate has holes and the sealing material fills the holes.

9. The radio frequency identification article of claim 8, wherein the substrate and/or the sealing material are formed from a plastic resin comprising polysulfone.

10. The radio frequency identification article of claim 9, wherein the plastic resin comprises polyarylsulfone.

11. A radio frequency identification article, comprises:
    a housing comprising a substrate;
    a radio frequency identification tag located on the substrate, the radio frequency identification tag comprising a microchip and an antenna; and
    a sealing material encompassing the substrate to form a barrier layer;
    wherein the housing is a single piece; and
    wherein the article has enhanced break strength and thermal resistance as compared to the article with the sealing material encompassing less than the whole substrate.

12. The radio frequency identification article of claim 11, wherein the substrate and/or the sealing material are formed from a plastic resin comprising polysulfone.

13. The radio frequency identification article of claim 12, wherein the plastic resin comprises polyarylsulfone.

14. A method of forming a radio frequency identification article comprising:
    placing a radio frequency identification tag in connection with a housing, wherein the radio frequency identification tag comprises a microchip and an antenna; and
    overmolding the housing with a sealing material that forms a barrier layer to provide enhanced break strength and/or thermal resistance;
    wherein the article has enhanced break strength and thermal resistance as compared to the article with the sealing material encompassing less than the whole substrate.

15. The method of claim 14, wherein the housing and/or the sealing material are formed from a plastic resin comprising polysulfone.

16. The method of claim 14, wherein the housing is a single piece.

* * * * *